UNITED STATES PATENT OFFICE.

MORTEN FLADMARK, OF BRETTESNES, NORWAY, ASSIGNOR TO TITAN CO. A/S., OF CHRISTIANIA, NORWAY.

PROCESS OF PRECIPITATING TITANIUM HYDRATES.

1,288,863.  Specification of Letters Patent.  Patented Dec. 24, 1918.

No Drawing.   Application filed May 10, 1917.  Serial No. 167,720.

*To all whom it may concern:*

Be it known that I, MORTEN FLADMARK, a subject of the King of Norway, residing at Brettesnes, Norway, have invented certain new and useful Improvements in the Process of Precipitating Titanium Hydrates; and I do hereby declare the following to be a full, clear, and exact description of the invention, such as will enable others skilled in the art to which it appertains to make and use the same.

This invention relates to the manufacture of titanium hydrates and has for its object a process of precipitating the hydrates from concentrated solutions.

It is known that several processes have been proposed for effecting the precipitation of titanium hydrates for technical purposes, but in all of these a dilute solution has been employed.

The precipitation of titanium hydrates from aqueous solutions is thought to depend upon the hydrolytical decomposition of the titanium salts resulting in a complete or partly colloidal solution of the titanium hydrates in the solvent in question.

The precipitation is then based upon the fact that the colloidal titanium hydroxid is caused to coagulate, whereby it is precipitated in a comparatively insoluble condition. As a result the hydrolytical equilibrium is disturbed and a new quantity of colloidal titanium hydroxid is produced by decomposition of the remaining titanium salts. This new quantity of hydroxid is again coagulated and so on, until the greater part of the titanium content is precipitated from the solution in the form of a hydrate.

The practical utility of the precipitation methods thus principally depends upon the degree of the hydrolytical decomposition and further also upon an efficient coagulation process.

In the well-known analytical methods the precipitation of the hydrates is accomplished by diluting the solution with water and heating. The technical use of this method is unprofitable owing to the expense incident to handling and filtering the large quantity of solution, and to the evaporation thereof when it is desired to recover the acid or salts present in the filtrate.

I have discovered a process whereby titanium hydrates may be precipitated from a solution in a much more economical and convenient method than heretofore employed and as above outlined. The solution to be employed in my process is one characterized by its high concentration of titanium compounds and the process is not interfered with by the presence of certain other substances in the solution, for example, compounds of elements ordinarily occurring in titaniferous deposits such as iron and the latter whether in the ferric or ferrous condition, nor does the acid liberated by the hydrolytic decomposition of the salts present interfere with the successful operation of my process. Good results have been obtained by me when employing a solution rich in titanium and poor in free acid, but I have found it convenient to precipitate from a solution containing from 80 to 350 grams of $TiO_2$ per liter and from 82 to 410 grams of $SO_3$ per liter not bound to other bases than titanium, and in the following illustration of this invention will make use of such a solution. For convenience in the preparation of such a solution, Norwegian Patent No. 27,292 of November 1, 1915, (which is embodied in United States patent application Serial No. 196,977, filed by Gustav Jebsen on October 12, 1917,) may be referred to. It is to be understood, however, that the choice of this solution is merely for convenience of illustration and that the invention is not to be limited thereto nor thereby.

When ilmenite is decomposed by sulfuric acid and the resultant product lixiviated in accordance with the said Norwegian patent, a solution is obtained containing less sulfuric acid than would be required to combine with the divalent iron, trivalent iron and tetravalent titanium present in the solution to form normal sulfates. This fact is clearly indicated by the following table which presents the results of analyses of several solutions prepared in this manner:

| Date. | $TiO_2$. | Ferrous iron. | Ferric iron. | $SO_3$ found. | $SO_3$ calculated as equivalent. | Shortage of $SO_3$. |
|---|---|---|---|---|---|---|
| April 10, 1915 | 69.3 | 42.3 | 18.6 | 233 | 239.1 | 6.1 |
| June 8, 1916 | 163.5 | 101.0 | 3.3 | 362 | 478.8 | 116.8 |
| June 8, 1916 | 180.5 | 130.6 | 0.0 | 392.0 | 548.3 | 156.3 |
| June 9, 1916 | 195.5 | 47.0 | 5.8 | 327.0 | 470.9 | 143.9 |
| June 9, 1916 | 210 | 49.3 | 0.0 | 311 | 490.7 | 179.7 |
| Oct. 26, 1916 | 99 | 53.7 | 29.2 | 297 | 337.8 | 40.8 |
| Oct. 26, 1916 | 97 | 89.7 | 0.8 | 293 | 324.3 | 31.3 |
| Jan. 5, 1917 | 169.2 | 84.6 | 40.8 | 488 | 547.4 | 59.4 |

This phenomenon may be explained in two ways, both of which are sufficient taken separately but which can also be thought cooperative, first, it is probable that the solution does not contain the normal but basic sulfates; second, it is probable that a considerable portion of the titanium in the solution does not exist in the form of normal or basic sulfate but in the form of a colloidal solution of titanium hydrates.

In carrying out my process with the solution employed I make use of any convenient apparatus which is suitable for the application of heat and which does not disintegrate into or otherwise contaminate the solution. A lead-lined container supplied with coils of lead pipe through which steam can be forced is a convenient container for this purpose. The concentrated solution is placed in the container and heat applied until the hydrates are precipitated to the degree sought. In employing the specific solution chosen for convenience of illustration, the degree of heat to be applied may for instance be that of the boiling point of the solution in question. If it is desired to hasten the process higher temperatures may be employed, and autoclaves made use of.

In applying my process to the solution chosen for illustrative purposes, I have obtained precipitates which upon analysis show 15 to 25 per cent. combined water, 3 to 7 per cent. of $SO_3$, and from a trace to 2 per cent. iron oxid, the remainder being titanium oxid. It is understood of course that this example of a precipitate obtained as aforesaid is purely illustrative and is not intended in any way to be a limitation hereof.

The filtrate obtained by the above process is a fairly concentrated solution containing undecomposed salts, and the decomposing agent liberated by the hydrolysis of the titanium compound. Because of this concentration the recovery of these materials can be effected, by any well known method, much more readily than where precipitation has been effected from dilute solutions with a resultant filtrate of low concentration, as in the case of previous processes.

The word "hydrates" as used herein is employed as a general term, and includes hydrated oxids with or without more or less basic salts or adsorbed acid.

The foregoing detailed description has been given for clearness of understanding and no undue limitation should be deduced therefrom, but the appended claims should be construed as broadly as permissible in view of the prior art.

What I claim as new and desire to secure by Letters Patent is:

1. The process of precipitating a titanium hydrate from a concentrated solution in which is present a titanium compound, which consists in heating the solution.

2. The process of precipitating a titanium hydrate from a concentrated solution in which titanium is present in the form of a salt and which is initially characterized by containing acid in substantially no greater quantity than is required to form normal salts with the base-forming material present, which consists in heating the solution.

3. The process of obtaining a precipitate comprising titanium hydrate and the $SO_4$ radical from a concentrated solution in which titanium sulfate is present, which consists in heating the solution.

4. The process of obtaining a precipitate comprising titanium hydrate and the $SO_4$ radical from a solution containing not less than 80 grams per liter of $TiO_2$ and 82 grams per liter of $SO_3$ not bound to other bases than titanium, which consists in heating the solution.

5. The process of effecting precipitation of a titanium hydrate from a concentrated solution in which there are present titanium and iron in the form of salts, which consists in heating the solution.

6. The process of precipitating a titanium hydrate from a concentrated solution in which there are present titanium and another metal in the form of salts and which is initially characterized by containing sulfuric acid in substantially no greater quantity than is required to form normal salts with the base-forming material present, which consists in heating the solution.

7. The process of precipitating a titanium hydrate from a concentrated solution in which are present titanium and iron in the form of salts and which is initially characterized by containing sulfuric acid in less quantity than is required to form normal salts with the base-forming material present, which consists in heating the solution.

In testimony that I claim the foregoing as my invention, I have signed my name in presence of two subscribing witnesses.

MORTEN FLADMARK.

Witnesses:
C. NORMAN,
C. FABRICIUS HANSEN.